(12) United States Patent
Liu

(10) Patent No.: US 10,719,693 B2
(45) Date of Patent: Jul. 21, 2020

(54) METHOD AND APPARATUS FOR OUTPUTTING INFORMATION OF OBJECT RELATIONSHIP

(71) Applicant: Baidu Online Network Technology (Beijing) Co., Ltd., Beijing (CN)

(72) Inventor: Wenxian Liu, Beijing (CN)

( * ) Notice: Subject to any disclaimer, the term of this patent is extended or adjusted under 35 U.S.C. 154(b) by 54 days.

(21) Appl. No.: 16/052,446

(22) Filed: Aug. 1, 2018

(65) Prior Publication Data

US 2019/0087683 A1 Mar. 21, 2019

(30) Foreign Application Priority Data

Sep. 21, 2017 (CN) .......................... 2017 1 0859525

(51) Int. Cl.
*G06K 9/00* (2006.01)
(52) U.S. Cl.
CPC ................. *G06K 9/00288* (2013.01)
(58) Field of Classification Search
None
See application file for complete search history.

(56) References Cited

U.S. PATENT DOCUMENTS

2011/0150340 A1  6/2011  Gotoh et al.
2016/0226586 A1* 8/2016  Hua ..................... H04B 10/116
2018/0032796 A1* 2/2018  Kuharenko ............... G06T 1/20
2018/0060648 A1* 3/2018  Yoo ..................... G06K 9/00899
2018/0157916 A1* 6/2018  Doumbouya .......... G06K 9/627
2018/0157939 A1* 6/2018  Butt ......................... G06K 9/66

FOREIGN PATENT DOCUMENTS

CN  105005774 A  10/2015
CN  105975914 A   9/2016
CN  106709482 A   5/2017
CN  106951858 A   7/2017

* cited by examiner

*Primary Examiner* — Justin P. Misleh
(74) *Attorney, Agent, or Firm* — Knobbe, Martens, Olson & Bear, LLP

(57) ABSTRACT

Embodiments of the present disclosure disclose a method and apparatus for outputting information. The method includes: acquiring a first image and a second image, the first image including a first face image region, and the second image including a second face image region; generating an image matrix of the first image and an image matrix of the second image; inputting respectively the image matrix of the first image and the image matrix of the second image into a pre-trained convolutional neural network to obtain a characteristic vector of the first image and a characteristic vector of the second image; calculating a distance between the characteristic vector of the first image and the characteristic vector of the second image; and outputting, based on the calculated distance, information of an object relationship between an object the first face image region belongs and an object the second face image region belongs.

21 Claims, 5 Drawing Sheets

METHOD AND APPARATUS FOR OUTPUTTING INFORMATION OF OBJECT RELATIONSHIP

CROSS-REFERENCE TO RELATED APPLICATIONS

This application is related to and claims priority from Chinese Application No. 201710859525.4, filed on Sep. 21, 2017 and entitled "Method and Apparatus for Outputting Information," the entire disclosure of which is hereby incorporated by reference.

TECHNICAL FIELD

The present disclosure relates to the field of computer technology, specifically to the field of Internet technology, and more specifically to a method and apparatus for outputting information.

BACKGROUND

Paternity testing is to analyze genetic characteristics from similar morphological structures or physiological functions between a parent and a child using theories and technologies in Forensic Medicine, Biology, and Genetics, to determine whether there is a paternity relationship between the parent and the child.

However, in the existing information outputting method, the paternity relationship between the parent and the child is generally determined through a DNA test, and then the determined information is outputted. In general, the DNA test needs to take a great deal of time, resulting in a low information output efficiency.

SUMMARY

An objective of some embodiments of the present disclosure is to provide an improved method and apparatus for outputting information to solve the technical problem mentioned in the foregoing Background section.

In a first aspect, some embodiments of the present disclosure provide a method for outputting information. The method includes: acquiring a first image and a second image, the first image including a first face image region, and the second image including a second face image region; generating an image matrix of the first image and an image matrix of the second image, rows of an image matrix corresponding to heights of an image, columns of the image matrix corresponding to widths of the image, and elements in the image matrix corresponding to pixels of the image; inputting respectively the image matrix of the first image and the image matrix of the second image into a pre-trained convolutional neural network to obtain a characteristic vector of the first image and a characteristic vector of the second image, the convolutional neural network being used to represent a corresponding relationship between an image matrix and a characteristic vector; calculating a distance between the characteristic vector of the first image and the characteristic vector of the second image; and outputting, based on the calculated distance, information of an object relationship between an object the first face image region belongs and an object the second face image region belongs, the object relationship including a paternity relationship and a non-paternity relationship.

In some embodiments, the method further includes training the convolutional neural network. The training the convolutional neural network includes: acquiring respectively an image matrix of a first sample image, an image matrix of a second sample image, and an image matrix of a third sample image; and performing following trainings: inputting respectively the image matrix of the first sample image, the image matrix of the second sample image, and the image matrix of the third sample image into an initialized convolutional neural network to obtain a characteristic vector of the first sample image, a characteristic vector of the second sample image, and a characteristic vector of the third sample image, determining whether characteristic vectors of the first sample image, the second sample image, and the third sample image satisfy a preset condition, and using the initialized convolutional neural network as the trained convolutional neural network if the characteristic vectors satisfy the preset condition.

In some embodiments, before the acquiring respectively an image matrix of a first sample image, an image matrix of a second sample image, and an image matrix of a third sample image, the method further includes: acquiring the first sample image and the second sample image, wherein the first sample image includes a first sample face image region, the second sample image includes a second sample face image region, and a relationship between an object the first sample face image region belongs and an object the second sample face image region belongs is the non-paternity relationship; generating the third sample image based on the first sample image and the second sample image, wherein the third sample image includes a third sample face image region, and the third sample face image region includes at least a part of the first sample face image region and/or at least a part of the second sample face image region; and generating respectively the image matrix of the first sample image, the image matrix of the second sample image, and the image matrix of the third sample image.

In some embodiments, the method further includes: adjusting, in response to the characteristic vectors not satisfying the preset condition, a parameter of the initialized convolutional neural network, and keeping performing the trainings.

In some embodiments, the determining whether characteristic vectors of the first sample image, the second sample image, and the third sample image satisfy a preset condition includes: calculating a distance between the characteristic vector of the first sample image and the characteristic vector of the third sample image and/or a distance between the characteristic vector of the second sample image and the characteristic vector of the third sample image to obtain a first calculation result; and determining, based on the first calculation result, whether the characteristic vectors satisfy the preset condition.

In some embodiments, the calculating a distance between the characteristic vector of the first sample image and the characteristic vector of the third sample image and/or a distance between the characteristic vector of the second sample image and the characteristic vector of the third sample image to obtain a first calculation result includes: calculating a Euclidean distance between the characteristic vector of the first sample image and the characteristic vector of the third sample image and/or a Euclidean distance between the characteristic vector of the second sample image and the characteristic vector of the third sample image to obtain the first calculation result.

In some embodiments, the determining, based on the first calculation result, whether the characteristic vectors satisfy the preset condition includes: determining whether the Euclidean distance between the characteristic vector of the first sample image and the characteristic vector of the third sample image and/or the Euclidean distance between the characteristic vector of the second sample image and the characteristic vector of the third sample image are less than a first preset distance threshold; determining the characteristic vectors satisfying the preset condition if the Euclidean distance between the characteristic vector of the first sample image and the characteristic vector of the third sample image and/or the Euclidean distance between the characteristic vector of the second sample image and the characteristic vector of the third sample image are less than the first preset distance threshold; and determining the characteristic vectors not satisfying the preset condition if the Euclidean distance between the characteristic vector of the first sample image and the characteristic vector of the third sample image and/or the Euclidean distance between the characteristic vector of the second sample image and the characteristic vector of the third sample image are not less than the first preset distance threshold.

In some embodiments, the determining whether characteristic vectors of the first sample image, the second sample image, and the third sample image satisfy a preset condition includes: calculating a distance between the characteristic vector of the first sample image and the characteristic vector of the second sample image to obtain a second calculation result; and determining, based on the second calculation result, whether the characteristic vectors satisfy the preset condition.

In some embodiments, the calculating a distance between the characteristic vector of the first sample image and the characteristic vector of the second sample image to obtain a second calculation result includes: calculating a Euclidean distance between the characteristic vector of the first sample image and the characteristic vector of the second sample image to obtain the second calculation result.

In some embodiments, the determining, based on the second calculation result, whether the characteristic vectors satisfy the preset condition includes: determining whether the Euclidean distance between the characteristic vector of the first sample image and the characteristic vector of the second sample image is greater than a second preset distance threshold; determining the characteristic vectors satisfying the preset condition if the Euclidean distance is greater than the second preset distance threshold; and determining the characteristic vectors not satisfying the preset condition if the Euclidean distance is not greater than the second preset distance threshold.

In some embodiments, the generating the third sample image based on the first sample image and the second sample image includes: dividing respectively the first sample face image region and the second sample face image region, to obtain a partial region set of the first sample face image region and a partial region set of the second sample face image region; selecting partial regions from the partial region set of the first sample face image region and the partial region set of the second sample face image region; and combining the selected partial regions to generate the third sample image.

In some embodiments, the generating the third sample image based on the first sample image and the second sample image includes: extracting respectively the characteristic vector of the first sample image and the characteristic vector of the second sample image; dividing respectively the characteristic vector of the first sample image and the characteristic vector of the second sample image to generate a sub-characteristic-vector set of the first sample image and a sub-characteristic-vector set of the second sample image; selecting sub-characteristic vectors from the sub-characteristic-vector set of the first sample image and the sub-characteristic-vector set of the second sample image; combining the selected sub-characteristic vectors to generate the characteristic vector of the third sample image; and generating the third sample image based on the characteristic vector of the third sample image.

In a second aspect, some embodiments of the present disclosure provide an apparatus for outputting information. The apparatus includes: an image acquiring unit, configured to acquire a first image and a second image, the first image including a first face image region, and the second image including a second face image region; a matrix generating unit, configured to generate an image matrix of the first image and an image matrix of the second image, rows of an image matrix corresponding to heights of an image, columns of the image matrix corresponding to widths of the image, and elements in the image matrix corresponding to pixels of the image; a matrix inputting unit, configured to input respectively the image matrix of the first image and the image matrix of the second image into a pre-trained convolutional neural network to obtain a characteristic vector of the first image and a characteristic vector of the second image, the convolutional neural network being used to represent a corresponding relationship between an image matrix and a characteristic vector; a distance calculating unit, configured to calculate a distance between the characteristic vector of the first image and the characteristic vector of the second image; and an information outputting unit, configured to output, based on the calculated distance, information of an object relationship between an object the first face image region belongs and an object the second face image region belongs, the object relationship including a paternity relationship and a non-paternity relationship.

In some embodiments, the apparatus further includes a network training unit. The network training unit includes: a matrix acquiring subunit, configured to respectively acquire an image matrix of a first sample image, an image matrix of a second sample image, and an image matrix of a third sample image; and a network training subunit, configured to perform following trainings: inputting respectively the image matrix of the first sample image, the image matrix of the second sample image, and the image matrix of the third sample image into an initialized convolutional neural network to obtain a characteristic vector of the first sample image, a characteristic vector of the second sample image, and a characteristic vector of the third sample image, determining whether characteristic vectors of the first sample image, the second sample image, and the third sample image satisfy a preset condition, and using the initialized convolutional neural network as the trained convolutional neural network if the characteristic vectors satisfy the preset condition.

In some embodiments, the network training unit further includes: a sample acquiring subunit, configured to acquire the first sample image and the second sample image, wherein the first sample image includes a first sample face image region, the second sample image includes a second sample face image region, and a relationship between an object the first sample face image region belongs and an object the second sample face image region belongs is the non-paternity relationship; a sample generating subunit, configured to generate the third sample image based on the first sample image and the second sample image, wherein the third sample image includes a third sample face image region, and the third sample face image region includes at least a part of the first sample face image region and/or at least a part of the second sample face image region; and a matrix generating subunit, configured to respectively generate the image matrix of the first sample image, the image matrix of the second sample image, and the image matrix of the third sample image.

In some embodiments, the network training unit further includes: a parameter adjusting subunit, configured to adjust, in response to the characteristic vectors not satisfying the preset condition, a parameter of the initialized convolutional neural network, and keep performing the trainings.

In some embodiments, the network training subunit comprises: a first calculating module, configured to calculate a distance between the characteristic vector of the first sample image and the characteristic vector of the third sample image and/or a distance between the characteristic vector of the second sample image and the characteristic vector of the third sample image to obtain a first calculation result; and a first determining module, configured to determine, based on the first calculation result, whether the characteristic vectors satisfy the preset condition.

In some embodiments, the first calculating module is further configured to calculate a Euclidean distance between the characteristic vector of the first sample image and the characteristic vector of the third sample image and/or a Euclidean distance between the characteristic vector of the second sample image and the characteristic vector of the third sample image to obtain the first calculation result.

In some embodiments, the first determining module is further configured to determine whether the Euclidean distance between the characteristic vector of the first sample image and the characteristic vector of the third sample image and/or the Euclidean distance between the characteristic vector of the second sample image and the characteristic vector of the third sample image are less than a first preset distance threshold; determine the characteristic vectors satisfying the preset condition if the Euclidean distance between the characteristic vector of the first sample image and the characteristic vector of the third sample image and/or the Euclidean distance between the characteristic vector of the second sample image and the characteristic vector of the third sample image are less than the first preset distance threshold; and determine the characteristic vectors not satisfying the preset condition if the Euclidean distance between the characteristic vector of the first sample image and the characteristic vector of the third sample image and/or the Euclidean distance between the characteristic vector of the second sample image and the characteristic vector of the third sample image are not less than the first preset distance threshold.

In some embodiments, the network training subunit includes: a second calculating module, configured to calculate a distance between the characteristic vector of the first sample image and the characteristic vector of the second sample image to obtain a second calculation result; and a second determining module, configured to determine, based on the second calculation result, whether the characteristic vectors satisfy the preset condition.

In some embodiments, the second calculating module is further configured to calculate a Euclidean distance between the characteristic vector of the first sample image and the characteristic vector of the second sample image to obtain the second calculation result.

In some embodiments, the second determining module is further configured to determine whether the Euclidean distance between the characteristic vector of the first sample image and the characteristic vector of the second sample image is greater than a second preset distance threshold; determine the characteristic vectors satisfying the preset condition if the Euclidean distance is greater than the second preset distance threshold; and determine the characteristic vectors not satisfying the preset condition if the Euclidean distance is not greater than the second preset distance threshold.

In some embodiments, the sample generating subunit includes: a dividing module, configured to respectively divide the first sample face image region and the second sample face image region, to obtain a partial region set of the first sample face image region and a partial region set of the second sample face image region; a first selecting module, configured to select partial regions from the partial region set of the first sample face image region and the partial region set of the second sample face image region; and a first combining module, configured to combine the selected partial regions to generate the third sample image.

In some embodiments, the sample generating subunit includes: an extracting module, configured to respectively extract the characteristic vector of the first sample image and the characteristic vector of the second sample image; a dividing module, configured to respectively divide the characteristic vector of the first sample image and the characteristic vector of the second sample image to generate a sub-characteristic-vector set of the first sample image and a sub-characteristic-vector set of the second sample image; a second selecting module, configured to select sub-characteristic vectors from the sub-characteristic-vector set of the first sample image and the sub-characteristic-vector set of the second sample image; a second combining module, configured to combine the selected sub-characteristic vectors to generate the characteristic vector of the third sample image; and a sample generating module, configured to generate the third sample image based on the characteristic vector of the third sample image In a third aspect, some embodiments of the present provide a server. The server includes: one or more processors; and a storage device, configured to store one or more programs. The one or more programs, when executed by the one or more processors, cause the one or more processors to implement the method described in any embodiment in the first aspect.

In a fourth aspect, some embodiments of the present provide a computer readable storage medium storing a computer program. The computer program, when executed by a processor, implements the method described in any embodiment in the first aspect.

In the method and apparatus for outputting information provided by some embodiments of the present disclosure, the image matrix of the first image and the image matrix of the second image are generated by acquiring the first image and the second image. The image matrix of the first image and the image matrix of the second image are respectively inputted into the pre-trained convolutional neural network to obtain the characteristic vector of the first image and the characteristic vector of the second image. Finally, the distance between the characteristic vector of the first image and the characteristic vector of the second image is calculated to output the information of the object relationship between the object the first face image region belongs and the object the second face image region belongs. The object relationship between the objects the face image regions in the images belong is determined by analyzing the images, thereby improving the information output efficiency.

BRIEF DESCRIPTION OF THE DRAWINGS

After reading detailed descriptions of non-limiting embodiments given with reference to the following accompanying drawings, other characteristics, objectives and advantages of the present disclosure will be more apparent.

DETAILED DESCRIPTION OF EMBODIMENTS

The present disclosure will be further described below in detail in combination with the accompanying drawings and the embodiments. It should be appreciated that the specific embodiments described herein are merely used for explaining the relevant disclosure, rather than limiting the disclosure. In addition, it should be noted that, for the ease of description, only the parts related to the relevant disclosure are shown in the accompanying drawings.

It should also be noted that the embodiments in the present disclosure and the features in the embodiments may be combined with each other on a non-conflict basis. The present disclosure will be described below in detail with reference to the accompanying drawings and in combination with the embodiments.

Figure 1:
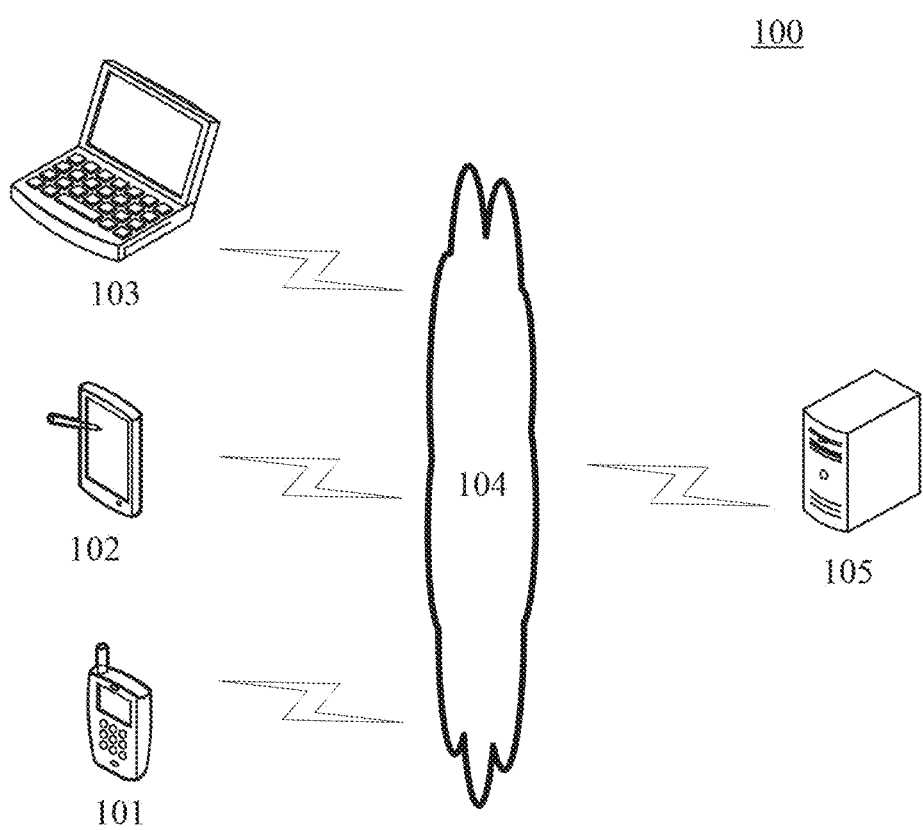
FIG. 1 is an architectural diagram of a system in which some embodiments of the present disclosure may be implemented.

FIG. 1 shows a system architecture 100 which may be used by a method for outputting information or an apparatus for outputting information according to some embodiments of the present disclosure.

As shown in FIG. 1, the system architecture 100 may include terminal devices 101, 102 and 103, a network 104 and a server 105. The network 104 serves as a medium providing a communication link between the terminal devices 101, 102 and 103 and the server 105. The network 104 may include various types of connections, such as wired or wireless transmission links, or optical fibers.

The terminal devices 101, 102 and 103 interact with the server 105 through the network 104, in order to receive or transmit messages, etc. Various communication client applications, such as object relationship identifying applications, image browsing applications, browser applications, or reading applications may be installed on the terminal devices 101, 102 and 103.

The terminal devices 101, 102 and 103 may be various electronic devices having display screens and supporting image browsing, including but not limited to, smart phones, tablet computers, eBook readers, laptop computers and desktop computers.

The server 105 may provide various services. For example, the server 105 may acquire a first image and a second image from the terminal devices 101, 102, and 103 through the network 104, perform processing such as analysis on the acquired first image and second image, and return the processing result (e.g., object relationship information) to the terminal devices 101, 102, and 103.

It should be noted that the method for outputting information provided in some embodiments of the present disclosure is generally performed by the server 105. Correspondingly, the apparatus for outputting information is generally provided in the server 105.

It should be appreciated that the numbers of the terminal devices, the networks, and the servers in FIG. 1 are merely illustrative. Any number of terminal devices, networks, and servers may be provided based on the actual requirements. In a situation where the server 105 stores the first image and the second image, the system architecture 100 may not include the terminal devices 101, 102 and 103.

Figure 2:
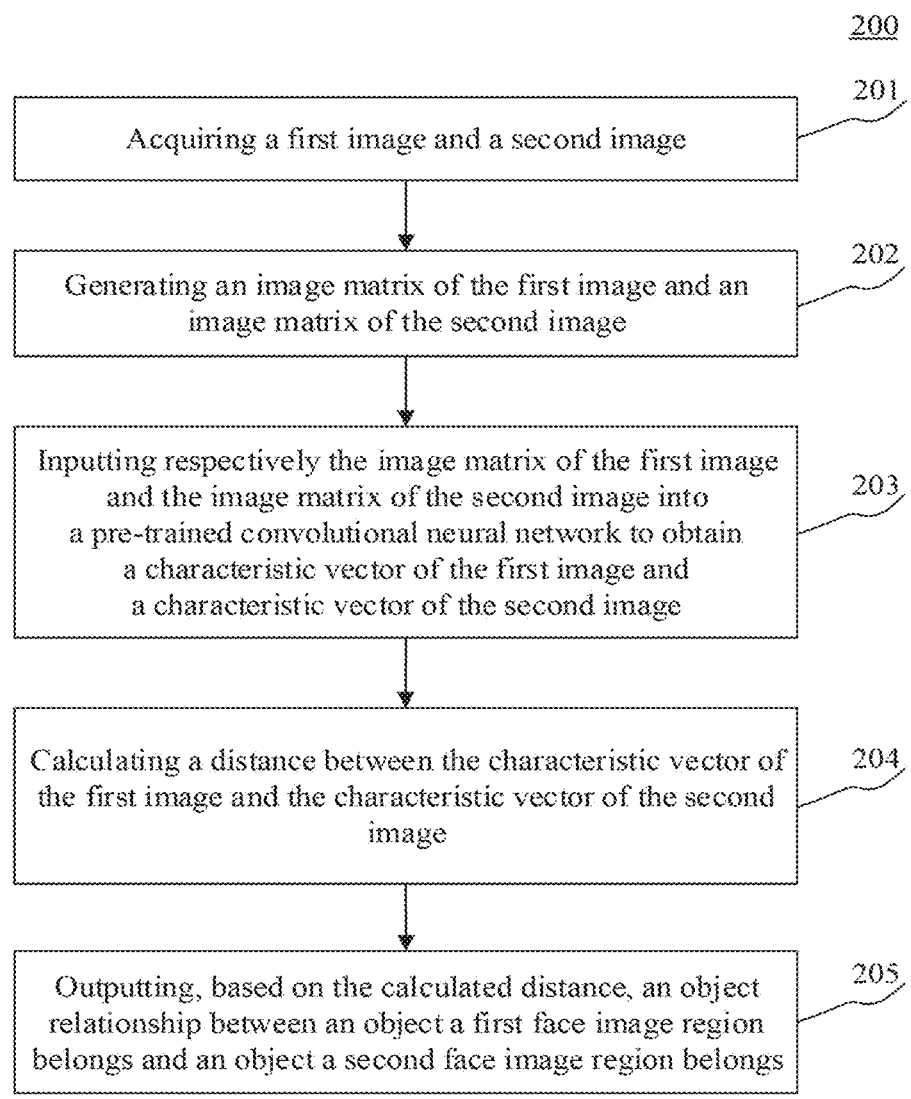
FIG. 2 is a flowchart of an embodiment of a method for outputting information according to the present disclosure.

Further referring to FIG. 2, FIG. 2 illustrates a flow 200 of an embodiment of a method for outputting information according to the present disclosure. The method for outputting information includes the following steps.

Step 201, acquiring a first image and a second image.

In some embodiments, an electronic device (e.g., the server 105 as illustrated in FIG. 1) on which the method for outputting information is performed may acquire the first image and the second image from a terminal device (e.g., the terminal devices 101, 102 and 103 as illustrated in FIG. 1) by means of a wired connection or a wireless connection. The first image may include a first face image region, and the second image may include a second face image region.

It should be noted that in a situation where the electronic device locally stores the first image and the second image, the electronic device may directly acquire the first image and the second image locally.

Step 202, generating an image matrix of the first image and an image matrix of the second image.

In some embodiments, based on the first image and the second image acquired in step 201, the electronic device may generate the image matrix of the first image and the image matrix of the second image. In practice, an image may be represented by a matrix. Specifically, the image may be analyzed and processed using a matrix theory and a matrix algorithm. Rows of the image matrix correspond to heights of the image, columns of the image matrix correspond to widths of the image, and elements in the image matrix correspond to pixels of the image. As an example, in a situation where the image is a gray image, an element in the image matrix may correspond to a grayscale value of the gray image. In a situation where the image is a color image, an element in the image matrix corresponds to an RGB (Red, Green, and Blue) value of the color image. In general, all colors perceived by human eyes are obtained by changing three color channels of red (R), green (G), and blue (B) and superposing them with each other.

Step 203, inputting respectively the image matrix of the first image and the image matrix of the second image into a pre-trained convolutional neural network to obtain a characteristic vector of the first image and a characteristic vector of the second image.

In some embodiments, based on the image matrix of the first image and the image matrix of the second image generated in step 202, the electronic device may input the image matrix of the first image and the image matrix of the second image into the pre-trained convolutional neural network to obtain the characteristic vector of the first image and the characteristic vector of the second image. Specifically, the electronic device may input the image matrix of the first image and the image matrix of the second image into an input side of the convolutional neural network, and output the characteristic vector of the first image and the characteristic vector of the second image from an output side of the convolutional neural network after being processed by each layer in the convolutional neural network. Here, the electronic device may perform processing (e.g., multiplication, or convolution) on an input of the each layer using a parameter matrix of the each layer. Characteristic vectors outputted from the output side are the characteristic vector of the first image and the characteristic vector of the second image. The characteristic vector of the image may be used to describe a characteristic of a face image region in the image. The characteristic vector of the first image may be used to describe a characteristic of the first face image region. The characteristic vector of the second image may be used to describe a characteristic of the second face image region.

In some embodiments, the convolutional neural network is a feedforward neural network, and an artificial neuron of the neural network may respond to a part of surrounding cells within the coverage range. Thus, the convolutional neural network has excellent performance in large image processing. In general, the basic structure of the convolutional neural network includes two layers. One of the two layers is a characteristic extraction layer, in which an input of each neuron is connected to a locally accepted domain of a former layer, and a local characteristic is extracted. Once the local characteristic is extracted, a positional relationship between the local characteristic and other characteristics is determined. The other of the two layers is a characteristic mapping layer. Each computing layer of the network is composed of a plurality of characteristic mappings. Each characteristic mapping is a plane, and weights of all neurons on the plane are equal to each other. In addition, an input of the convolutional neural network is an image matrix, and an output of the convolutional neural network is a characteristic vector, so that the convolutional neural network may be used to represent a corresponding relationship between the image matrix and the characteristic vector.

As an example, the convolutional neural network may be an AlexNet. AlexNet is an existing structure of the convolutional neural network. In the 2012 ImageNet (a name of a computer vision system identification project, which is the world's largest database of image recognition) competition, the structure used by Geoffrey and his student Alex is called AlexNet. Generally, AlexNet includes eight layers, the first five layers are convolutional layers and the last three layers are fully-connected layers. The characteristic vector of the image may be outputted after the image matrix of the image is inputted into AlexNet and processed by each layer of AlexNet.

As another example, the convolutional neural network may be a GoogleNet. GoogleNet is also an existing structure of the convolutional neural network, which is the champion model in the 2014 ImageNet competition. Basic components of GoogleNet are similar to AlexNet and GoogleNet is a 22-layer model. The characteristic vector of the image may be outputted after the image matrix of the image is inputted into GoogleNet and processed by each layer of GoogleNet.

In some embodiments, the electronic device may pre-train the convolutional neural network in various ways. As an example, based on statistics on image matrices and characteristic vectors of a large number of images, the electronic device may generate a corresponding relationship table including a plurality of corresponding relationships between the image matrices and the characteristic vectors, and use the corresponding relationship table as the convolutional neural network.

Step 204, calculating a distance between the characteristic vector of the first image and the characteristic vector of the second image.

In some embodiments, based on the characteristic vector of the first image and the characteristic vector of the second image obtained in step 203, the electronic device may calculate the distance between the characteristic vector of the first image and the characteristic vector of the second image. The distance between the characteristic vector of the first image and the characteristic vector of the second image may be used to measure a similarity between the characteristic vector of the first image and the characteristic vector of the second image. In general, the smaller or the closer to a certain numerical value the distance is, the higher the similarity is. The greater or the more deviated from the certain numerical value the distance is, the lower the similarity is.

In some alternative implementations of this embodiment, the electronic device may calculate a Euclidean distance between the characteristic vector of the first image and the characteristic vector of the second image. The Euclidean distance may also be referred to as the Euclidean metric, which generally refers to a real distance between two points in an m-dimensional space, or a natural length of a vector (i.e., a distance from a point to the origin). A Euclidean distance in 2-dimensional and 3-dimensional spaces is the real distance between two points. In general, the smaller the Euclidean distance between two vectors is, the higher the similarity is. The greater the Euclidean distance between the two vectors is, the lower the similarity is.

In some alternative implementations of this embodiment, the electronic device may calculate a cosine distance between the characteristic vector of the first image and the characteristic vector of the second image. The cosine distance may also be referred to as the cosine similarity. The similarity between two vectors is evaluated by calculating a cosine value of an angle between the two vectors. Generally, the smaller the angle between the two vectors is, and the closer to 1 the cosine value is, the higher the similarity is. The larger the angle between the two vectors is, and the more deviated from 1 the cosine value is, the lower the similarity is.

Step 205, outputting, based on the calculated distance, an object relationship between an object a first face image region belongs and an object a second face image region belongs.

In some embodiments, based on the distance calculated in step 204, the electronic device may perform a numerical analysis on the calculated distance by using various analysis approaches to identify an object relationship between the object the first face image region belongs and the object the second face image region belongs, and output information of the object relationship. The object relationship may include a paternity relationship and a non-paternity relationship. The similarity between the characteristic vectors of the images of the objects having the paternity relationship is high, and the similarity between the characteristic vectors of the images of the objects having the non-paternity relationship is low.

In some alternative implementations of this embodiment, the electronic device may compare the Euclidean distance between the characteristic vector of the first image and the characteristic vector of the second image with a first preset distance threshold. If the Euclidean distance is less than the first preset distance threshold, the object relationship between the object the first face image region belongs and the object the second face image region belongs is the paternity relationship. If the Euclidean distance is not less than the first preset distance threshold, the object relationship between the object the first face image region belongs and the object the second face image region belongs is the non-paternity relationship.

In some alternative implementations of this embodiment, the electronic device may compare the cosine distance between the characteristic vector of the first image and the characteristic vector of the second image with 1. If the cosine distance is close to 1, the object relationship between the object the first face image region belongs and the object the second face image region belongs is the paternity relationship. If the cosine distance is deviated from 1, the object relationship between the object the first face image region belongs and the object the second face image region belongs is the non-paternity relationship.

Figure 3:
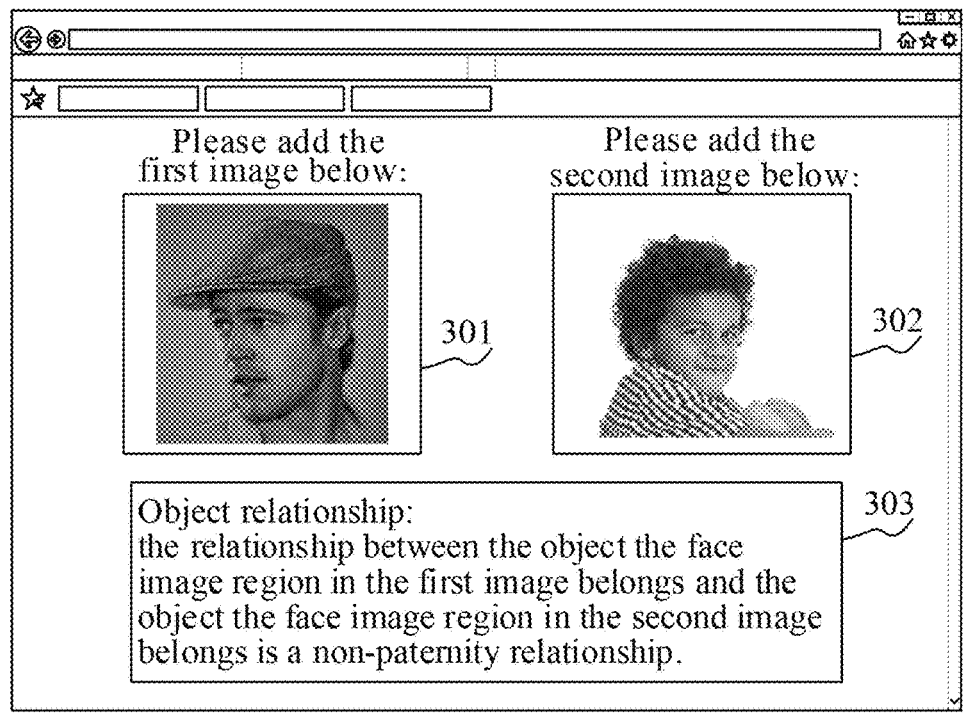
FIG. 3 is a schematic diagram of an application scenario of the method for outputting information according to some embodiments of the present disclosure.

Further referring to FIG. 3, FIG. 3 is a schematic diagram of an application scenario of the method for outputting information according to some embodiments of the present disclosure. In the application scenario of FIG. 3, first, the user uploads the first image 301 including the first face image region and the second image 302 including the second face image region to the electronic device through the terminal device. Next, the electronic device generates the image matrix of the first image 301 and the image matrix of the second image 302. Then, the electronic device may respectively input the image matrix of the first image 301 and the image matrix of the second image 302 into the pre-trained convolutional neural network, so as to obtain the characteristic vector of the first image 301 and the characteristic vector of the second image 302. Next, the electronic device may calculate the distance between the characteristic vector of the first image 301 and the characteristic vector of the second image 302. Finally, the electronic device may identify the object relationship between the object the first face image region belongs and the object the second face image region belongs based on the calculated distance, and send the object relationship 303 to the terminal device. The terminal device may display the first image 301, the second image 302, and the object relationship 303.

In the method for outputting information provided by some embodiments of the present disclosure, the image matrix of the first image and the image matrix of the second image are generated by acquiring the first image and the second image. Then, the image matrix of the first image and the image matrix of the second image are respectively inputted into the pre-trained convolutional neural network, to obtain the characteristic vector of the first image and the characteristic vector of the second image. Finally, the distance between the characteristic vector of the first image and the characteristic vector of the second image is calculated, so as to output information of the object relationship between the object the first face image region belongs and the object the second face image region belongs. The object relationship between the objects the face image regions in the images belong is identified by analyzing the images, thereby improving the information output efficiency.

Figure 4:
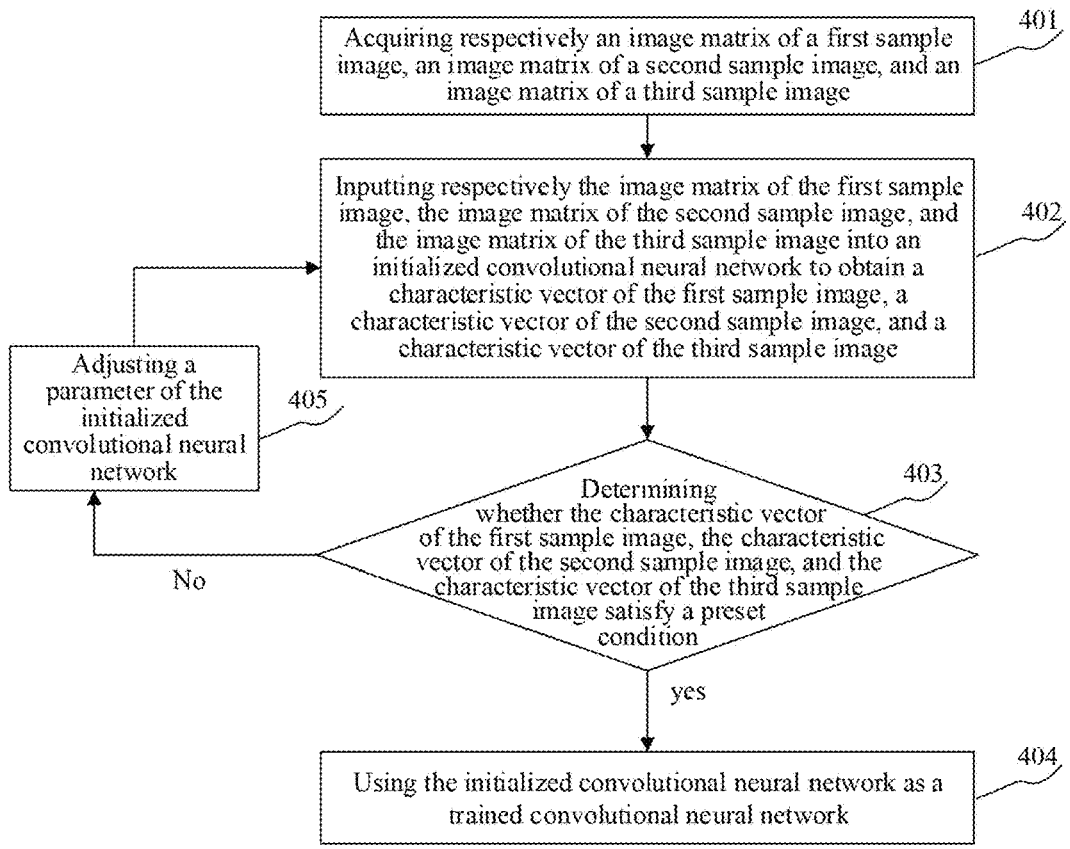
FIG. 4 is a flowchart of an embodiment of a method for training a convolutional neural network according to the present disclosure.

Further referring to FIG. 4, FIG. 4 illustrates a flow 400 of an embodiment of a method for training a convolutional neural network. The flow 400 of the method for training a convolutional neural network includes the following steps.

Step 401, acquiring respectively an image matrix of a first sample image, an image matrix of a second sample image, and an image matrix of a third sample image.

In some embodiments, an electronic device (e.g., the server 105 as illustrated in FIG. 1) on which the method for training a convolutional neural network is performed may respectively acquire the image matrix of the first sample image, the image matrix of the second sample image, and the image matrix of the third sample image.

Step 402, inputting respectively the image matrix of the first sample image, the image matrix of the second sample image, and the image matrix of the third sample image into an initialized convolutional neural network to obtain a characteristic vector of the first sample image, a characteristic vector of the second sample image, and a characteristic vector of the third sample image.

In some embodiments, based on the image matrix of the first sample image, the image matrix of the second sample image, and the image matrix of the third sample image acquired in step 401, the electronic device may respectively input the image matrix of the first sample image, the image matrix of the second sample image, and the image matrix of the third sample image into the initialized convolutional neural network to obtain the characteristic vector of the first sample image, the characteristic vector of the second sample image, and the characteristic vector of the third sample image. Specifically, the electronic device may respectively input the image matrix of the first sample image, the image matrix of the second sample image, and the image matrix of the third sample image into an input side of the initialized convolutional neural network, and output the characteristic vector of the first sample image, the characteristic vector of the second sample image, and the characteristic vector of the third sample image from an output side of the initialized convolutional neural network after being sequentially processed by each layer in the convolutional neural network. Here, the electronic device may perform processing (e.g., multiplication or convolution) on an input of the each layer using a parameter matrix of the each layer. The characteristic vectors outputted from the output side are the characteristic vector of the first sample image, the characteristic vector of the second sample image, and the characteristic vector of the third sample image. The initialized convolutional neural network stores an initialization parameter, and the initialization parameter may be continuously adjusted during the process of training the convolutional neural network.

Step 403, determining whether the characteristic vector of the first sample image, the characteristic vector of the second sample image, and the characteristic vector of the third sample image satisfy a preset condition.

In some embodiments, based on the characteristic vector of the first sample image, the characteristic vector of the second sample image, and the characteristic vector of the third sample image obtained in step 402, the electronic device may determine whether characteristic vectors of the first sample image, the second sample image, and the third sample image satisfy the preset condition. In a situation where the characteristic vectors satisfy the preset condition, step 404 is performed. In a situation where the characteristic vectors do not satisfy the preset condition, step 405 is performed. Specifically, first, the electronic device may respectively acquire certain rules possessed by the characteristic vectors of the first sample image, the second sample image, and the third sample image; and then determine whether the acquired rules conform to a preset rule. If the rules conform to the preset rule, the characteristic vectors satisfy the preset condition. If the rules do not conform to the preset rule, the characteristic vectors do not satisfy the preset condition. As an example, the electronic device may respectively determine whether the characteristic vectors of the first sample image, the second sample image, and the third sample image can accurately represent characteristics possessed by the first sample image, the second sample image, and the third sample image. If the characteristic vectors can accurately represent the characteristics of the first sample image, the second sample image, and the third sample image, the characteristic vectors satisfy the preset condition. If the characteristic vectors cannot accurately represent the characteristics of the first sample image, the second sample image, and the third sample image, the characteristic vectors do not satisfy the preset condition.

Step 404, using the initialized convolutional neural network as a trained convolutional neural network.

In some embodiments, when the characteristic vectors satisfy the preset condition, it is indicated that the training of the convolutional neural network is completed. In such case, the electronic device may use the initialized convolutional neural network as the trained convolutional neural network.

Step 405, adjusting a parameter of the initialized convolutional neural network.

In some embodiments, when the characteristic vectors do not satisfy the preset condition, the electronic device may adjust the parameter of the initialized convolutional neural network, and return to perform step 402 until the trained convolutional neural network can represent an accurate corresponding relationship between the image matrix and the characteristic vector.

In the method for training a convolutional neural network provided by some embodiments of the present disclosure, the image matrix of the first sample image, the image matrix of the second sample image, and the image matrix of the third sample image are acquired, so as to perform the following training steps. The characteristic vector of the first sample image, the characteristic vector of the second sample image, and the characteristic vector of the third sample image are obtained by inputting the image matrix of the first sample image, the image matrix of the second sample image, and the image matrix of the third sample image into the initialized convolutional neural network. It is determined whether the characteristic vectors of the first sample image, the second sample image, and the third sample image satisfy the preset condition. If the characteristic vectors satisfy the preset condition, it is indicated that the training of the convolutional neural network is completed. In such case, the initialized convolutional neural network is used as the trained convolutional neural network. If the characteristic vectors do not satisfy the preset condition, it is indicated that the training of the convolutional neural network is not completed. In such case, the parameter of the initialized convolutional neural network is adjusted, and the training steps are continuously performed until the training of the convolutional neural network is completed. Therefore, the quick training of the convolutional neural network capable of representing the corresponding relationship between the image matrix and the characteristic vector is implemented.

Figure 5:
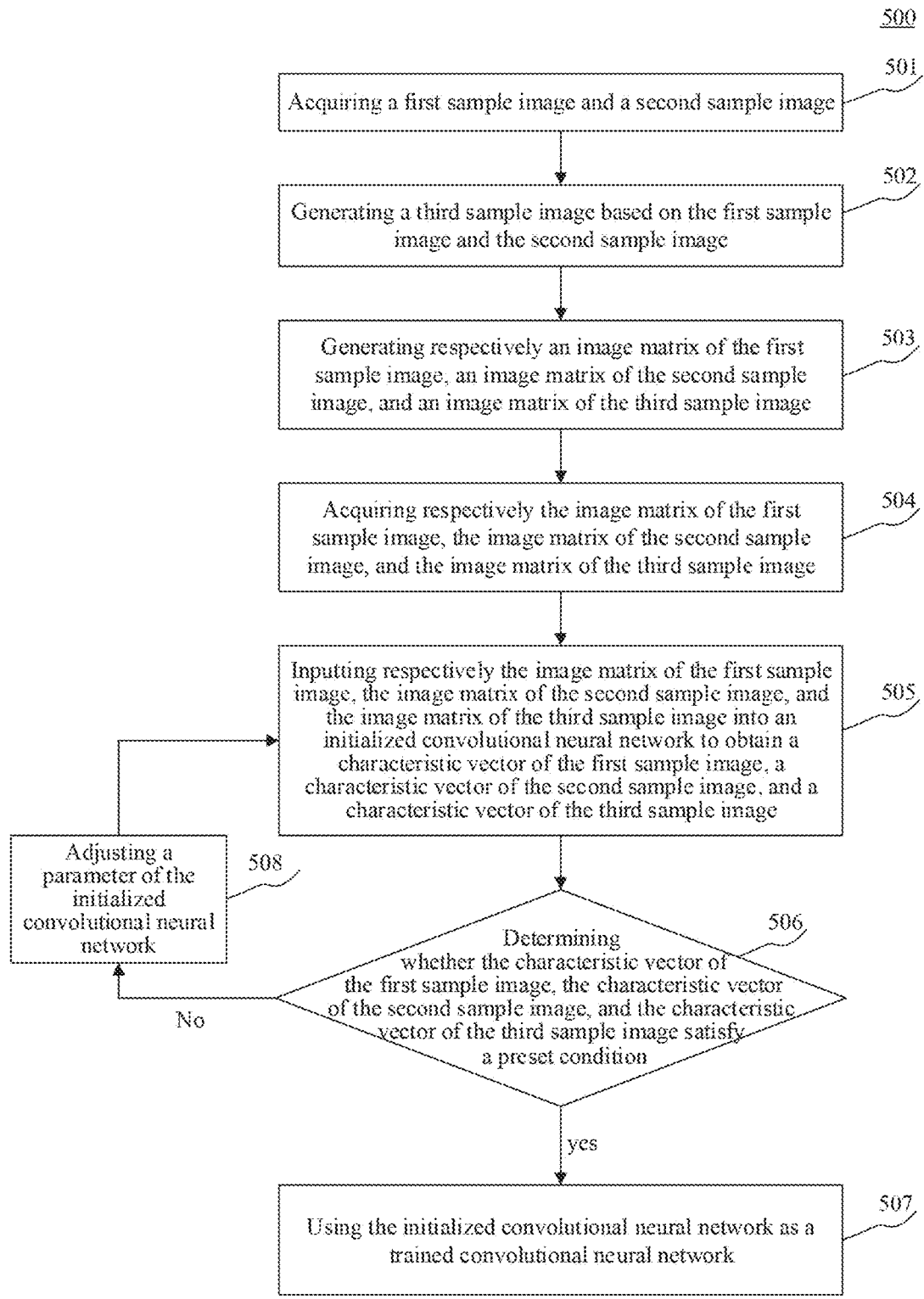
FIG. 5 is a flowchart of another embodiment of the method for training a convolutional neural network according to the present disclosure.

Further referring to FIG. 5, FIG. 5 illustrates a flow 500 of another embodiment of the method for training a convolutional neural network. The flow 500 of the method for training a convolutional neural network includes the following steps.

Step 501, acquiring a first sample image and a second sample image.

In some embodiments, an electronic device (e.g., the server 105 as illustrated in FIG. 1) on which the method for training a convolutional neural network is performed may acquire the first sample image and the second sample image from a terminal device (e.g., the terminal devices 101, 102 and 103 as illustrated in FIG. 1) by means of a wired connection or a wireless connection. The first sample image may include a first sample face image region, and the second sample image may include a second sample face image region. A relationship between an object the first sample face image region belongs and an object the second sample face image region belongs may be a non-paternity relationship. As an example, the relationship between the object the first sample face image region belongs and the object the second sample face image region belongs may be a conjugal relationship.

It should be noted that in a situation where the electronic device locally stores the first sample image and the second sample image, the electronic device may directly acquire the first sample image and the second sample image locally.

Step 502, generating a third sample image based on the first sample image and the second sample image.

In some embodiments, based on the first sample image and the second sample image acquired in step 501, the electronic device may generate the third sample image. The third sample image may include a third sample face image region, and the third sample face image region may include at least a part of the first sample face image region and/or at least a part of the second sample face image region. As an example, the third sample face image region may include a face contour region and an ear region of the first sample face image region, and an eyebrow region, an eye region, a nose region, and a mouth region of the second sample face image region.

In some embodiments, the electronic device may generate the third sample image in various ways.

As an example, the electronic device may generate the third sample image in the following way.

First, the first sample face image region and the second sample face image region are respectively divided to obtain a partial region set of the first sample face image region and a partial region set of the second sample face image region.

Specifically, the electronic device may divide the first sample face image region into a face contour region, an ear region, an eyebrow region, an eye region, a nose region, and a mouth region from, and divide the second sample face image region into a face contour region, an ear region, an eyebrow region, an eye region, a nose region, and a mouth region.

Then, a partial region is selected from the partial region set of the first sample face image region and the partial region set of the second sample face image region.

For example, the electronic device may select the face contour region and the ear region from the partial region set of the first sample face image region, and select the eyebrow region, the eye region, the nose region, and the mouth region from the partial region set of the second sample face image region.

Finally, the selected partial regions are combined to generate the third sample image.

For example, the electronic device may compose a face image region using the face contour region and the ear region selected from the partial region set of the first sample face image region and the eyebrow region, the eye region, the nose region, and the mouth region selected from the partial region set of the second sample face image region, and use the face image region as a third face image region.

As another example, the electronic device may also generate the third sample image in the following way.

First, a characteristic vector of the first sample image and a characteristic vector of the second sample image are extracted respectively.

Specifically, the electronic device may extract the characteristic vector of the first sample image and the characteristic vector of the second sample image using a convolutional neural network that may extract a characteristic vector of an image.

Then, the characteristic vector of the first sample image and the characteristic vector of the second sample image are respectively divided to generate a sub-characteristic-vector set of the first sample image and a sub-characteristic-vector set of the second sample image.

For example, the electronic device may divide the characteristic vector of the first sample image to obtain elements representing characteristics of the face contour region, the ear region, the eyebrow region, the eye region, the nose region, and the mouth region of the first sample face image region, divide the characteristic vector of the second sample image to obtain elements representing characteristics of the face contour region, the ear region, the eyebrow region, the eye region, the nose region, and the mouth region of the second sample face image region, and use the elements as sub-characteristic vectors.

Next, a sub-characteristic vector is selected from the sub-characteristic-vector set of the first sample image and the sub-characteristic-vector set of the second sample image.

For example, the electronic device may select sub-characteristic vectors representing characteristics of the face contour region and the ear region from the sub-characteristic-vector set of the first sample image, and select sub-characteristic vectors representing characteristics of the eyebrow region, the eye region, the nose region, and the mouth region from the sub-characteristic-vector set of the second sample image.

Then, the selected sub-characteristic vectors are combined to generate a characteristic vector of the third sample image.

The electronic device may compose a characteristic vector representing a characteristic of an face image region using the sub-characteristic vectors representing the characteristics of the face contour region and the ear region and selected from the sub-characteristic-vector set of the first sample image, and the sub-characteristic vectors representing the characteristics of the eyebrow region, the eye region, the nose region, and the mouth region and selected from the sub-characteristic-vector set of the second sample image, and use the composed characteristic vector as the characteristic vector of the third sample image.

Finally, based on the characteristic vector of the third sample image, the third sample image is generated.

Specifically, the electronic device may process the characteristic vector of the third sample image into the third sample image using a deconvolutional neural network.

Step 503, generating respectively an image matrix of the first sample image, an image matrix of the second sample image, and an image matrix of the third sample image.

In some embodiments, based on the first sample image and the second sample image acquired in step 501 and the third sample image generated in step 502, the electronic device may respectively generate the image matrix of the first sample image, the image matrix of the second sample image, and the image matrix of the third sample image.

Step 504, acquiring respectively the image matrix of the first sample image, the image matrix of the second sample image, and the image matrix of the third sample image.

In some embodiments, the electronic device may acquire the image matrix of the first sample image, the image matrix of the second sample image, and the image matrix of the third sample image generated in step 503.

Step 505, inputting respectively the image matrix of the first sample image, the image matrix of the second sample image, and the image matrix of the third sample image into an initialized convolutional neural network to obtain a characteristic vector of the first sample image, a characteristic vector of the second sample image, and a characteristic vector of the third sample image.

In some embodiments, based on the image matrix of the first sample image, the image matrix of the second sample image, and the image matrix of the third sample image acquired in step 504, the electronic device may respectively input the image matrix of the first sample image, the image matrix of the second sample image, and the image matrix of the third sample image into the initialized convolutional neural network to obtain the characteristic vector of the first sample image, the characteristic vector of the second sample image, and the characteristic vector of the third sample image. Specifically, the electronic device may respectively input the image matrix of the first sample image, the image matrix of the second sample image, and the image matrix of the third sample image into an input side of the initialized convolutional neural network, and output the characteristic vector of the first sample image, the characteristic vector of the second sample image, and the characteristic vector of the third sample image from an output side of the initialized convolutional neural network after being sequentially processed by each layer in the convolutional neural network. Here, the electronic device may perform processing (e.g., multiplication, or convolution) on an input of the each layer using a parameter matrix of the each layer. Characteristic vectors outputted from the output side are the characteristic vector of the first sample image, the characteristic vector of the second sample image, and the characteristic vector of the third sample image. The initialized convolutional neural network stores an initialization parameter, and the initialization parameter may be continuously adjusted during the process of training the convolutional neural network.

Step 506, determining whether the characteristic vector of the first sample image, the characteristic vector of the second sample image, and the characteristic vector of the third sample image satisfy a preset condition.

In some embodiments, based on the characteristic vector of the first sample image, the characteristic vector of the second sample image, and the characteristic vector of the third sample image obtained in step 505, the electronic device may determine whether characteristic vectors of the first sample image, the second sample image, and the third sample image satisfy the preset condition. If the characteristic vectors satisfy the preset condition, step 507 is performed. If the characteristic vectors do not satisfy the preset condition, step 508 is performed. Specifically, first, the electronic device may respectively acquire certain rules possessed by the characteristic vectors of the first sample image, the second sample image, and the third sample image; and then determine whether the acquired rules conform to a preset rule. If the rules conform to the preset rule, the characteristic vectors satisfy the preset condition. If the rules do not conform to the preset rule, the characteristic vectors do not satisfy the preset condition.

In some alternative implementations of this embodiment, the electronic device may determine whether the characteristic vectors of the first sample image, the second sample image, and the third sample image satisfy the preset condition using at least one of the following approaches.

In a first approach, first, a distance between the characteristic vector of the first sample image and the characteristic vector of the third sample image and/or a distance between the characteristic vector of the second sample image and the characteristic vector of the third sample image are calculated to obtain a first calculation result.

As an example, the electronic device may calculate a Euclidean distance between the characteristic vector of the first sample image and the characteristic vector of the third sample image and/or a Euclidean distance between the characteristic vector of the second sample image and the characteristic vector of the third sample image to obtain the first calculation result.

As another example, the electronic device may calculate a cosine distance between the characteristic vector of the first sample image and the characteristic vector of the third sample image and/or a cosine distance between the characteristic vector of the second sample image and the characteristic vector of the third sample image to obtain the first calculation result.

Then, based on the first calculation result, it is determined whether the characteristic vectors satisfy the preset condition.

As an example, the electronic device may determine whether the Euclidean distance between the characteristic vector of the first sample image and the characteristic vector of the third sample image and/or the Euclidean distance between the characteristic vector of the second sample image and the characteristic vector of the third sample image are less than a first preset distance threshold. If the Euclidean distance between the characteristic vector of the first sample image and the characteristic vector of the third sample image and/or the Euclidean distance between the characteristic vector of the second sample image and the characteristic vector of the third sample image are less than the first preset distance threshold, the characteristic vectors satisfy the preset condition. If the Euclidean distance between the characteristic vector of the first sample image and the characteristic vector of the third sample image and/or the Euclidean distance between the characteristic vector of the second sample image and the characteristic vector of the third sample image are not less than the first preset distance threshold, the characteristic vectors do not satisfy the preset condition.

As another example, the electronic device may compare the cosine distance between the characteristic vector of the first sample image and the characteristic vector of the third sample image and/or the cosine distance between the characteristic vector of the second sample image and the characteristic vector of the third sample image with 1. If the cosine distance between the characteristic vector of the first sample image and the characteristic vector of the third sample image and/or the cosine distance between the characteristic vector of the second sample image and the characteristic vector of the third sample image are close to 1, the characteristic vectors satisfy the preset condition. If the cosine distance between the characteristic vector of the first sample image and the characteristic vector of the third sample image and/or the cosine distance between the characteristic vector of the second sample image and the characteristic vector of the third sample image are deviated from 1, the characteristic vectors do not satisfy the preset condition.

In a second approach, first, a distance between the characteristic vector of the first sample image and the characteristic vector of the second sample image is calculated to obtain a second calculation result.

As an example, the electronic device may calculate a Euclidean distance between the characteristic vector of the first sample image and the characteristic vector of the second sample image to obtain the second calculation result.

As another example, the electronic device may calculate a cosine distance between the characteristic vector of the first sample image and the characteristic vector of the second sample image to obtain the second calculation result.

Then, based on the second calculation result, it is determined whether the characteristic vectors satisfy the preset condition.

As an example, the electronic device may determine whether the Euclidean distance between the characteristic vector of the first sample image and the characteristic vector of the second sample image is greater than a second preset distance threshold. If the Euclidean distance is greater than the second preset distance threshold, the characteristic vectors satisfy the preset condition. If the Euclidean distance is not greater than the second preset distance threshold, the characteristic vectors do not satisfy the preset condition.

As another example, the electronic device may compare the cosine distance between the characteristic vector of the first sample image and the characteristic vector of the second sample image with 1. If the cosine distance is deviated from 1, the characteristic vectors satisfy the preset condition. If the cosine distance is close to 1, the characteristic vectors do not satisfy the preset condition.

Step 507, using the initialized convolutional neural network as a trained convolutional neural network.

In some embodiments, in a situation where the characteristic vectors satisfy the preset condition, it is indicated that the training of the convolutional neural network is completed. In such case, the electronic device may use the initialized convolutional neural network as the trained convolutional neural network. The trained convolutional neural network may make a similarity between characteristic vectors of images of objects having a paternity relationship as high as possible, and make a similarity between characteristic vectors of images of objects having a non-paternity relationship as low as possible.

Step 508, adjusting a parameter of the initialized convolutional neural network.

In some embodiments, in a situation where the characteristic vectors do not satisfy the preset condition, the electronic device may adjust the parameter of the initialized convolutional neural network, and return to perform step 505 until the trained convolutional neural network can represent an accurate corresponding relationship between the image matrix and the characteristic vector.

As may be seen from FIG. 5, compared with the embodiment corresponding to FIG. 4, steps 501-503 are added into the flow 500 of the method for training a convolutional neural network in some embodiments. Therefore, the convolutional neural network trained through the solution described in some embodiments may make the similarity between the characteristic vectors of the images of the objects having the paternity relationship as high as possible, and make the similarity between the characteristic vectors of the images of the objects having the non-paternity relationship as low as possible.

Figure 6:
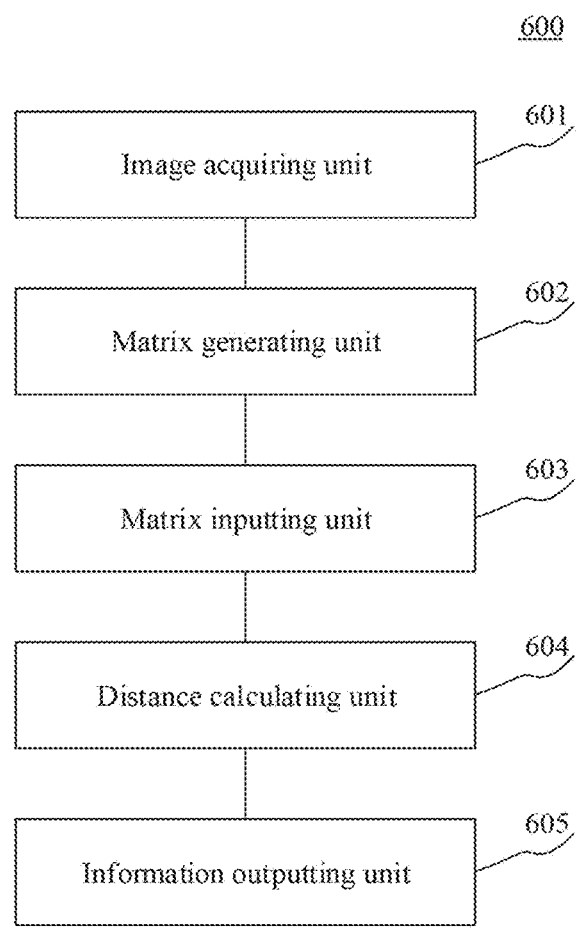
FIG. 6 is a schematic structural diagram of an embodiment of an apparatus for outputting information according to the present disclosure.

Further referring to FIG. 6, as an implementation of the method shown in the above figures, the present disclosure provides an embodiment of an apparatus for outputting information. The embodiment of the apparatus corresponds to the embodiment of the method as illustrated in FIG. 2, and this apparatus may be applied in various electronic devices.

As shown in FIG. 6, the apparatus for outputting information 600 in some embodiments may include: an image acquiring unit 601, a matrix generating unit 602, a matrix inputting unit 603, a distance calculating unit 604, and an information outputting unit 605. The image acquiring unit

601 is configured to acquire a first image and a second image. The first image includes a first face image region, and the second image includes a second face image region. The matrix generating unit 602 is configured to generate an image matrix of the first image and an image matrix of the second image. Rows of an image matrix corresponding to heights of an image, columns of the image matrix corresponding to widths of the image, and elements in the image matrix corresponding to pixels of the image. The matrix inputting unit 603 is configured to respectively input the image matrix of the first image and the image matrix of the second image into a pre-trained convolutional neural network to obtain a characteristic vector of the first image and a characteristic vector of the second image. The convolutional neural network is used to represent a corresponding relationship between an image matrix and a characteristic vector. The distance calculating unit 604 is configured to calculate a distance between the characteristic vector of the first image and the characteristic vector of the second image. The information outputting unit 605 is configured to output, based on the calculated distance, information of an object relationship between an object the first face image region belongs and an object the second face image region belongs. The object relationship includes a paternity relationship and a non-paternity relationship.

In some embodiments, for specific processes of the image acquiring unit 601, the matrix generating unit 602, the matrix inputting unit 603, the distance calculating unit 604, and the information outputting unit 605 in the apparatus for outputting information 600, and their technical effects, reference may be made to relative descriptions of step 201, step 202, step 203, step 204 and step 205 in the corresponding embodiment of FIG. 2 respectively, which will not be repeatedly described here.

In some alternative implementations of this embodiment, the apparatus for outputting information 600 may further include a network training unit (not shown). The network training unit may include: a matrix acquiring subunit (not shown), configured to respectively acquire an image matrix of a first sample image, an image matrix of a second sample image, and an image matrix of a third sample image; and a network training subunit (not shown), configured to perform following trainings: inputting respectively the image matrix of the first sample image, the image matrix of the second sample image, and the image matrix of the third sample image into an initialized convolutional neural network to obtain a characteristic vector of the first sample image, a characteristic vector of the second sample image, and a characteristic vector of the third sample image, determining whether characteristic vectors of the first sample image, the second sample image, and the third sample image satisfy a preset condition, and using the initialized convolutional neural network as the trained convolutional neural network if the characteristic vectors satisfy the preset condition.

In some alternative implementations of this embodiment, the network training unit may further include: a sample acquiring subunit (not shown), configured to acquire the first sample image and the second sample image, wherein the first sample image includes a first sample face image region, the second sample image includes a second sample face image region, and a relationship between an object the first sample face image region belongs and an object the second sample face image region belongs is the non-paternity relationship; a sample generating subunit (not shown), configured to generate the third sample image based on the first sample image and the second sample image, wherein the third sample image includes a third sample face image region, and the third sample face image region includes at least a part of the first sample face image region and/or at least a part of the second sample face image region; and a matrix generating subunit (not shown), configured to respectively generate the image matrix of the first sample image, the image matrix of the second sample image, and the image matrix of the third sample image.

In some alternative implementations of this embodiment, the network training unit may further include: a parameter adjusting subunit (not shown), configured to adjust, in response to the characteristic vectors not satisfying the preset condition, a parameter of the initialized convolutional neural network, and keep performing the trainings.

In some alternative implementations of this embodiment, the network training subunit may include: a first calculating module (not shown), configured to calculate a distance between the characteristic vector of the first sample image and the characteristic vector of the third sample image and/or a distance between the characteristic vector of the second sample image and the characteristic vector of the third sample image to obtain a first calculation result; and a first determining module (not shown), configured to determine, based on the first calculation result, whether the characteristic vectors satisfy the preset condition.

In some alternative implementations of this embodiment, the first calculating module may further be configured to calculate a Euclidean distance between the characteristic vector of the first sample image and the characteristic vector of the third sample image and/or a Euclidean distance between the characteristic vector of the second sample image and the characteristic vector of the third sample image to obtain the first calculation result.

In some alternative implementations of this embodiment, the first determining module may further be configured to determine whether the Euclidean distance between the characteristic vector of the first sample image and the characteristic vector of the third sample image and/or the Euclidean distance between the characteristic vector of the second sample image and the characteristic vector of the third sample image are less than a first preset distance threshold; determine the characteristic vectors satisfying the preset condition if the Euclidean distance between the characteristic vector of the first sample image and the characteristic vector of the third sample image and/or the Euclidean distance between the characteristic vector of the second sample image and the characteristic vector of the third sample image are less than the first preset distance threshold; and determine the characteristic vectors not satisfying the preset condition if the Euclidean distance between the characteristic vector of the first sample image and the characteristic vector of the third sample image and/or the Euclidean distance between the characteristic vector of the second sample image and the characteristic vector of the third sample image are not less than the first preset distance threshold.

In some alternative implementations of this embodiment, the network training subunit may include: a second calculating module (not shown), configured to calculate a distance between the characteristic vector of the first sample image and the characteristic vector of the second sample image to obtain a second calculation result; and a second determining module (not shown), configured to determine, based on the second calculation result, whether the characteristic vectors satisfy the preset condition.

In some alternative implementations of this embodiment, the second calculating module may further be configured to calculate a Euclidean distance between the characteristic vector of the first sample image and the characteristic vector of the second sample image to obtain the second calculation result.

In some alternative implementations of this embodiment, the second determining module may further be configured to determine whether the Euclidean distance between the characteristic vector of the first sample image and the characteristic vector of the second sample image is greater than a second preset distance threshold; determine the characteristic vectors satisfying the preset condition if the Euclidean distance is greater than the second preset distance threshold; and determine the characteristic vectors not satisfying the preset condition if the Euclidean distance is not greater than the second preset distance threshold.

In some alternative implementations of this embodiment, the sample generating subunit may include: a dividing module (not shown), configured to respectively divide the first sample face image region and the second sample face image region, to obtain a partial region set of the first sample face image region and a partial region set of the second sample face image region; a first selecting module (not shown), configured to select partial regions from the partial region set of the first sample face image region and the partial region set of the second sample face image region; and a first combining module (not shown), configured to combine the selected partial regions to generate the third sample image.

In some alternative implementations of this embodiment, the sample generating subunit may include: an extracting module (not shown), configured to respectively extract the characteristic vector of the first sample image and the characteristic vector of the second sample image; a dividing module (not shown), configured to respectively divide the characteristic vector of the first sample image and the characteristic vector of the second sample image to generate a sub-characteristic-vector set of the first sample image and a sub-characteristic-vector set of the second sample image; a second selecting module (not shown), configured to select sub-characteristic vectors from the sub-characteristic-vector set of the first sample image and the sub-characteristic-vector set of the second sample image; a second combining module (not shown), configured to combine the selected sub-characteristic vectors to generate the characteristic vector of the third sample image; and a sample generating module (not shown), configured to generate the third sample image based on the characteristic vector of the third sample image.

Figure 7:
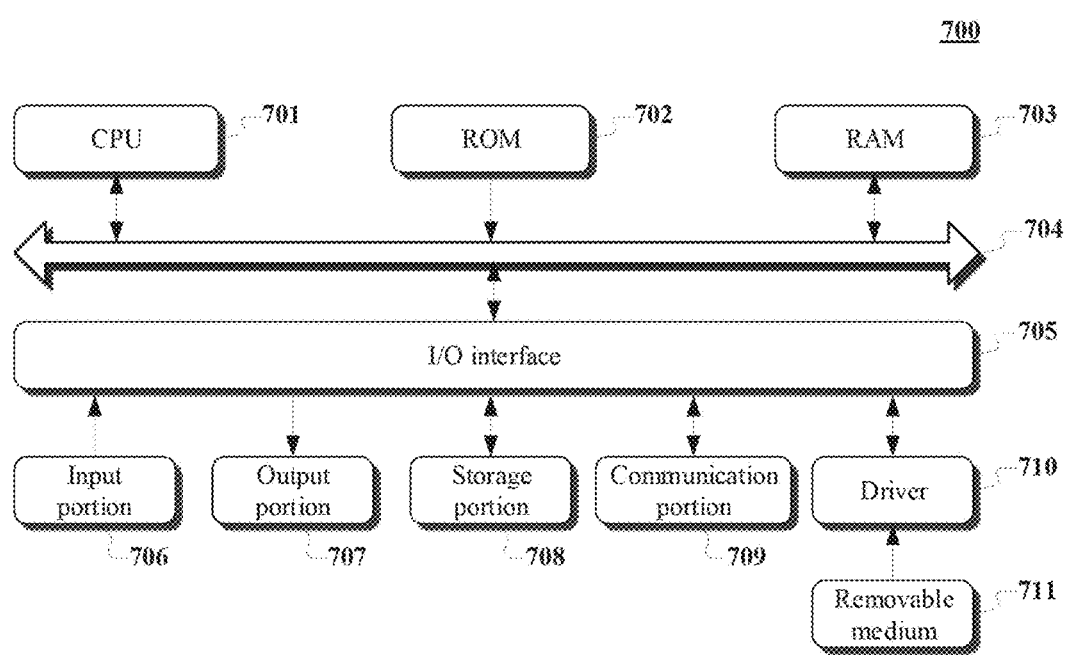
FIG. 7 is a schematic structural diagram of a computer system adapted to implement a server according to some embodiments of the present disclosure.

Referring to FIG. 7, a schematic structural diagram of a computer system 700 adapted to implement a server of some embodiments of the present disclosure is shown. The server shown in FIG. 7 is merely an example, and should not bring any limitations to the functions and the scope of use of the embodiments of the present disclosure.

As shown in FIG. 7, the computer system 700 includes a central processing unit (CPU) 701, which may execute various appropriate actions and processes in accordance with a program stored in a read-only memory (ROM) 702 or a program loaded into a random access memory (RAM) 703 from a storage portion 708. The RAM 703 also stores various programs and data required by operations of the system 700. The CPU 701, the ROM 702 and the RAM 703 are connected to each other through a bus 704. An input/output (I/O) interface 705 is also connected to the bus 704.

The following components are connected to the I/O interface 705: an input portion 706 including a keyboard, a mouse etc.; an output portion 707 comprising a cathode ray tube (CRT), a liquid crystal display device (LCD), a speaker etc.; a storage portion 708 including a hard disk and the like; and a communication portion 709 comprising a network interface card, such as a LAN card and a modem. The communication portion 709 performs communication processes via a network, such as the Internet. A driver 710 is also connected to the I/O interface 705 as required. A removable medium 711, such as a magnetic disk, an optical disk, a magneto-optical disk, and a semiconductor memory, may be installed on the driver 710, to facilitate the retrieval of a computer program from the removable medium 711, and the installation thereof on the storage portion 708 as needed.

In particular, according to some embodiments of the present disclosure, the process described above with reference to the flow chart may be implemented in a computer software program. For example, an embodiment of the present disclosure includes a computer program product, which comprises a computer program that is tangibly embedded in a machine-readable medium. The computer program comprises program codes for executing the method as illustrated in the flow chart. In such an embodiment, the computer program may be downloaded and installed from a network via the communication portion 709, and/or may be installed from the removable media 711. The computer program, when executed by the central processing unit (CPU) 701, implements the above mentioned functionalities as defined by the methods of the present disclosure.

It should be noted that the computer readable medium in the present disclosure may be computer readable signal medium or computer readable storage medium or any combination of the above two. An example of the computer readable storage medium may include, but not limited to: electric, magnetic, optical, electromagnetic, infrared, or semiconductor systems, apparatus, elements, or a combination any of the above. A more specific example of the computer readable storage medium may include but is not limited to: electrical connection with one or more wire, a portable computer disk, a hard disk, a random access memory (RAM), a read only memory (ROM), an erasable programmable read only memory (EPROM or flash memory), a fibre, a portable compact disk read only memory (CD-ROM), an optical memory, a magnet memory or any suitable combination of the above. In the present disclosure, the computer readable storage medium may be any physical medium containing or storing programs which can be used by a command execution system, apparatus or element or incorporated thereto. In the present disclosure, the computer readable signal medium may include data signal in the base band or propagating as parts of a carrier, in which computer readable program codes are carried. The propagating signal may take various forms, including but not limited to: an electromagnetic signal, an optical signal or any suitable combination of the above. The signal medium that can be read by computer may be any computer readable medium except for the computer readable storage medium. The computer readable medium is capable of transmitting, propagating or transferring programs for use by, or used in combination with, a command execution system, apparatus or element. The program codes contained on the computer readable medium may be transmitted with any suitable medium including but not limited to: wireless, wired, optical cable, RF medium etc., or any suitable combination of the above.

The flow charts and block diagrams in the accompanying drawings illustrate architectures, functions and operations that may be implemented according to the systems, methods and computer program products of the various embodiments of the present disclosure. In this regard, each of the blocks in the flow charts or block diagrams may represent a module, a program segment, or a code portion, said module, program segment, or code portion comprising one or more executable instructions for implementing specified logic functions. It should also be noted that, in some alternative implementations, the functions denoted by the blocks may occur in a sequence different from the sequences shown in the figures. For example, any two blocks presented in succession may be executed, substantially in parallel, or they may sometimes be in a reverse sequence, depending on the function involved. It should also be noted that each block in the block diagrams and/or flow charts as well as a combination of blocks may be implemented using a dedicated hardware-based system executing specified functions or operations, or by a combination of a dedicated hardware and computer instructions.

The units involved in some embodiments of the present disclosure may be implemented by means of software or hardware. The described units may also be provided in a processor, for example, described as: a processor, comprising an image acquiring unit, a matrix generating unit, a matrix inputting unit, a distance calculating unit, and an information outputting unit, where the names of these units do not in some cases constitute a limitation to such units themselves. For example, the image acquiring unit may also be described as "a unit for acquiring a first image and a second image."

In another aspect, some embodiments of the present disclosure further provide a computer-readable storage medium. The computer-readable storage medium may be the computer storage medium included in the server in the above described embodiments, or a stand-alone computer-readable storage medium not assembled into the server. The computer-readable storage medium stores one or more programs. The one or more programs, when executed by a server, cause the server to: acquiring a first image and a second image, the first image including a first face image region, and the second image including a second face image region; generating an image matrix of the first image and an image matrix of the second image, rows of an image matrix corresponding to heights of an image, columns of the image matrix corresponding to widths of the image, and elements in the image matrix corresponding to pixels of the image; inputting respectively the image matrix of the first image and the image matrix of the second image into a pre-trained convolutional neural network to obtain a characteristic vector of the first image and a characteristic vector of the second image, the convolutional neural network being used to represent a corresponding relationship between an image matrix and a characteristic vector; calculating a distance between the characteristic vector of the first image and the characteristic vector of the second image;

and outputting, based on the calculated distance, information of an object relationship between an object the first face image region belongs and an object the second face image region belongs, the object relationship including a paternity relationship and a non-paternity relationship.

The above description only provides an explanation of the preferred embodiments of the present disclosure and the technical principles used. It should be appreciated by those skilled in the art that the inventive scope of the present disclosure is not limited to the technical solutions formed by the particular combinations of the above-described technical features. The inventive scope should also cover other technical solutions formed by any combinations of the above-described technical features or equivalent features thereof without departing from the concept of the disclosure. Technical schemes formed by the above-described features being interchanged with, but not limited to, technical features with similar functions disclosed in the present disclosure are examples.

What is claimed is:

1. A method for outputting information, comprising:
   acquiring a first image and a second image, the first image including a first face image region, and the second image including a second face image region;
   generating an image matrix of the first image and an image matrix of the second image, rows of an image matrix corresponding to heights of an image, columns of the image matrix corresponding to widths of the image, and elements in the image matrix corresponding to pixels of the image;
   inputting respectively the image matrix of the first image and the image matrix of the second image into a pre-trained convolutional neural network to obtain a characteristic vector of the first image and a characteristic vector of the second image, the convolutional neural network being used to represent a corresponding relationship between an image matrix and a characteristic vector;
   calculating a distance between the characteristic vector of the first image and the characteristic vector of the second image; and
   outputting, based on the calculated distance, information of an object relationship between an object the first face image region belongs and an object the second face image region belongs, the object relationship including a paternity relationship and a non-paternity relationship,
   wherein the method is performed by at least one processor.

2. The method according to claim 1, wherein the pre-trained convolutional neural network is obtained by:
   acquiring respectively an image matrix of a first sample image, an image matrix of a second sample image, and an image matrix of a third sample image; and
   performing following trainings: inputting respectively the image matrix of the first sample image, the image matrix of the second sample image, and the image matrix of the third sample image into an initialized convolutional neural network to obtain a characteristic vector of the first sample image, a characteristic vector of the second sample image, and a characteristic vector of the third sample image, determining that the characteristic vectors of the first sample image, the second sample image, and the third sample image satisfy a preset condition, and using the initialized convolutional neural network as the pre-trained convolutional neural network in response to determining that the characteristic vectors of the first sample image, the second sample image, and the third sample image satisfy the preset condition.

3. The method according to claim 2, wherein before the acquiring respectively an image matrix of a first sample image, an image matrix of a second sample image, and an image matrix of a third sample image, the method further comprises:
   acquiring the first sample image and the second sample image, wherein the first sample image includes a first sample face image region, the second sample image includes a second sample face image region, and a relationship between an object the first sample face image region belongs and an object the second sample face image region belongs is the non-paternity relationship;

generating the third sample image based on the first sample image and the second sample image, wherein the third sample image includes a third sample face image region, and the third sample face image region includes at least a part of the first sample face image region and/or at least a part of the second sample face image region; and generating respectively the image matrix of the first sample image, the image matrix of the second sample image, and the image matrix of the third sample image.

4. The method according to claim 3, further comprising:
adjusting, in response to the characteristic vectors of the first sample image, the second sample image, and the third sample image not satisfying the preset condition, a parameter of the initialized convolutional neural network, and keeping performing the trainings.

5. The method according to claim 4, wherein the determining that characteristic vectors of the first sample image, the second sample image, and the third sample image satisfy a preset condition comprises:
calculating a distance between the characteristic vector of the first sample image and the characteristic vector of the third sample image and/or a distance between the characteristic vector of the second sample image and the characteristic vector of the third sample image to obtain a first calculation result; and
determining, based on the first calculation result, that the characteristic vectors of the first sample image, the second sample image, and the third sample image satisfy the preset condition.

6. The method according to claim 5, wherein the calculating a distance between the characteristic vector of the first sample image and the characteristic vector of the third sample image and/or a distance between the characteristic vector of the second sample image and the characteristic vector of the third sample image to obtain a first calculation result comprises:
calculating a Euclidean distance between the characteristic vector of the first sample image and the characteristic vector of the third sample image and/or a Euclidean distance between the characteristic vector of the second sample image and the characteristic vector of the third sample image to obtain the first calculation result.

7. The method according to claim 6, wherein the determining, based on the first calculation result, that the characteristic vectors of the first sample image, the second sample image, and the third sample image satisfy the preset condition comprises:
determining whether the Euclidean distance between the characteristic vector of the first sample image and the characteristic vector of the third sample image and/or the Euclidean distance between the characteristic vector of the second sample image and the characteristic vector of the third sample image are less than a first preset distance threshold;
determining the characteristic vectors of the first sample image, the second sample image, and the third sample image satisfying the preset condition if the Euclidean distance between the characteristic vector of the first sample image and the characteristic vector of the third sample image and/or the Euclidean distance between the characteristic vector of the second sample image and the characteristic vector of the third sample image are less than the first preset distance threshold; and
determining the characteristic vectors of the first sample image, the second sample image, and the third sample image not satisfying the preset condition if the Euclidean distance between the characteristic vector of the first sample image and the characteristic vector of the third sample image and/or the Euclidean distance between the characteristic vector of the second sample image and the characteristic vector of the third sample image are not less than the first preset distance threshold.

8. The method according to claim 4, wherein the determining that characteristic vectors of the first sample image, the second sample image, and the third sample image satisfy a preset condition comprises:
calculating a distance between the characteristic vector of the first sample image and the characteristic vector of the second sample image to obtain a second calculation result; and
determining, based on the second calculation result, that the characteristic vectors of the first sample image, the second sample image, and the third sample image satisfy the preset condition.

9. The method according to claim 8, wherein the calculating a distance between the characteristic vector of the first sample image and the characteristic vector of the second sample image to obtain a second calculation result comprises:
calculating a Euclidean distance between the characteristic vector of the first sample image and the characteristic vector of the second sample image to obtain the second calculation result.

10. The method according to claim 9, wherein the determining, based on the second calculation result, that the characteristic vectors of the first sample image, the second sample image, and the third sample image satisfy the preset condition comprises:
determining whether the Euclidean distance between the characteristic vector of the first sample image and the characteristic vector of the second sample image is greater than a second preset distance threshold;
determining the characteristic vectors of the first sample image, the second sample image, and the third sample image satisfying the preset condition if the Euclidean distance is greater than the second preset distance threshold; and
determining the characteristic vectors of the first sample image, the second sample image, and the third sample image not satisfying the preset condition if the Euclidean distance is not greater than the second preset distance threshold.

11. The method according to claim 3, wherein the generating the third sample image based on the first sample image and the second sample image comprises:
dividing respectively the first sample face image region and the second sample face image region, to obtain a partial region set of the first sample face image region and a partial region set of the second sample face image region;
selecting partial regions from the partial region set of the first sample face image region and the partial region set of the second sample face image region; and
combining the selected partial regions to generate the third sample image.

12. The method according to claim 3, wherein the generating the third sample image based on the first sample image and the second sample image comprises:
- extracting respectively the characteristic vector of the first sample image and the characteristic vector of the second sample image;
- dividing respectively the characteristic vector of the first sample image and the characteristic vector of the second sample image to generate a sub-characteristic-vector set of the first sample image and a sub-characteristic-vector set of the second sample image;
- selecting sub-characteristic vectors from the sub-characteristic-vector set of the first sample image and the sub-characteristic-vector set of the second sample image;
- combining the selected sub-characteristic vectors to generate the characteristic vector of the third sample image; and
- generating the third sample image based on the characteristic vector of the third sample image.

13. An apparatus for outputting information, comprising:
at least one processor; and
a memory storing instructions, the instructions when executed by the at least one processor, cause the at least one processor to perform operations, the operations comprising:
- acquiring a first image and a second image, the first image including a first face image region, and the second image including a second face image region;
- generating an image matrix of the first image and an image matrix of the second image, rows of an image matrix corresponding to heights of an image, columns of the image matrix corresponding to widths of the image, and elements in the image matrix corresponding to pixels of the image;
- inputting respectively the image matrix of the first image and the image matrix of the second image into a pre-trained convolutional neural network to obtain a characteristic vector of the first image and a characteristic vector of the second image, the convolutional neural network being used to represent a corresponding relationship an image matrix and a characteristic vector;
- calculating a distance between the characteristic vector of the first image and the characteristic vector of the second image; and
- outputting, based on the calculated distance, information of an object relationship between an object the first face image region belongs and an object the second face image region belongs, the object relationship including a paternity relationship and a non-paternity relationship.

14. The apparatus according to claim 13, wherein the pre-trained convolutional neural network is obtained by:
- acquiring an image matrix of a first sample image, an image matrix of a second sample image, and an image matrix of a third sample image; and
- performing following trainings: inputting respectively the image matrix of the first sample image, the image matrix of the second sample image, and the image matrix of the third sample image into an initialized convolutional neural network to obtain a characteristic vector of the first sample image, a characteristic vector of the second sample image, and a characteristic vector of the third sample image, determining that the characteristic vectors of the first sample image, the second sample image, and the third sample image satisfy a preset condition, and using the initialized convolutional neural network as the pre-trained convolutional neural network in response to determining that the characteristic vectors of the first sample image, the second sample image, and the third sample image satisfy the preset condition.

15. The apparatus according to claim 14, wherein the operations further comprise:
- acquiring the first sample image and the second sample image, wherein the first sample image includes a first sample face image region, the second sample image includes a second sample face image region, and a relationship between an object the first sample face image region belongs and an object the second sample face image region belongs is the non-paternity relationship;
- generating the third sample image based on the first sample image and the second sample image, wherein the third sample image includes a third sample face image region, and the third sample face image region includes at least a part of the first sample face image region and/or at least a part of the second sample face image region; and
- generating respectively the image matrix of the first sample image, the image matrix of the second sample image, and the image matrix of the third sample image.

16. The apparatus according to claim 15, wherein the operations further comprise:
- adjusting, in response to the characteristic vectors of the first sample image, the second sample image, and the third sample image not satisfying the preset condition, a parameter of the initialized convolutional neural network, and keep performing the trainings.

17. The apparatus according to claim 16, wherein the determining that characteristic vectors of the first sample image, the second sample image, and the third sample image satisfy a preset condition comprises:
- calculating a distance between the characteristic vector of the first sample image and the characteristic vector of the third sample image and/or a distance between the characteristic vector of the second sample image and the characteristic vector of the third sample image to obtain a first calculation result; and
- determining, based on the first calculation result, that the characteristic vectors of the first sample image, the second sample image, and the third sample image satisfy the preset condition.

18. The apparatus according to claim 16, wherein the determining that characteristic vectors of the first sample image, the second sample image, and the third sample image satisfy a preset condition comprises:
- calculating a distance between the characteristic vector of the first sample image and the characteristic vector of the second sample image to obtain a second calculation result; and
- determining, based on the second calculation result, that the characteristic vectors of the first sample image, the second sample image, and the third sample image satisfy the preset condition.

19. The apparatus according to claim 15, wherein the generating the third sample image based on the first sample image and the second sample image comprises:
- dividing respectively the first sample face image region and the second sample face image region, to obtain a partial region set of the first sample face image region and a partial region set of the second sample face image region;

selecting partial regions from the partial region set of the first sample face image region and the partial region set of the second sample face image region; and combining the selected partial regions to generate the third sample image.

20. The apparatus according to claim 15, wherein the generating the third sample image based on the first sample image and the second sample image comprises:

extracting respectively the characteristic vector of the first sample image and the characteristic vector of the second sample image;

dividing respectively the characteristic vector of the first sample image and the characteristic vector of the second sample image to generate a sub-characteristic-vector set of the first sample image and a sub-characteristic-vector set of the second sample image;

selecting sub-characteristic vectors from the sub-characteristic-vector set of the first sample image and the sub-characteristic-vector set of the second sample image;

combining the selected sub-characteristic vectors to generate the characteristic vector of the third sample image; and generating the third sample image based on the characteristic vector of the third sample image.

21. A non-transitory computer storage medium storing a computer program, the computer program when executed by one or more processors, causes the one or more processors to perform operations, the operations comprising:

acquiring a first image and a second image, the first image including a first face image region, and the second image including a second face image region;

generating an image matrix of the first image and an image matrix of the second image, rows of an image matrix corresponding to heights of an image, columns of the image matrix corresponding to widths of the image, and elements in the image matrix corresponding to pixels of the image;

inputting respectively the image matrix of the first image and the image matrix of the second image into a pre-trained convolutional neural network to obtain a characteristic vector of the first image and a characteristic vector of the second image, the convolutional neural network being used to represent a corresponding relationship between an image matrix and a characteristic vector;

calculating a distance between the characteristic vector of the first image and the characteristic vector of the second image; and outputting, based on the calculated distance, information of an object relationship between an object the first face image region belongs and an object the second face image region belongs, the object relationship including a paternity relationship and a non-paternity relationship.

* * * * *